Figure 1:
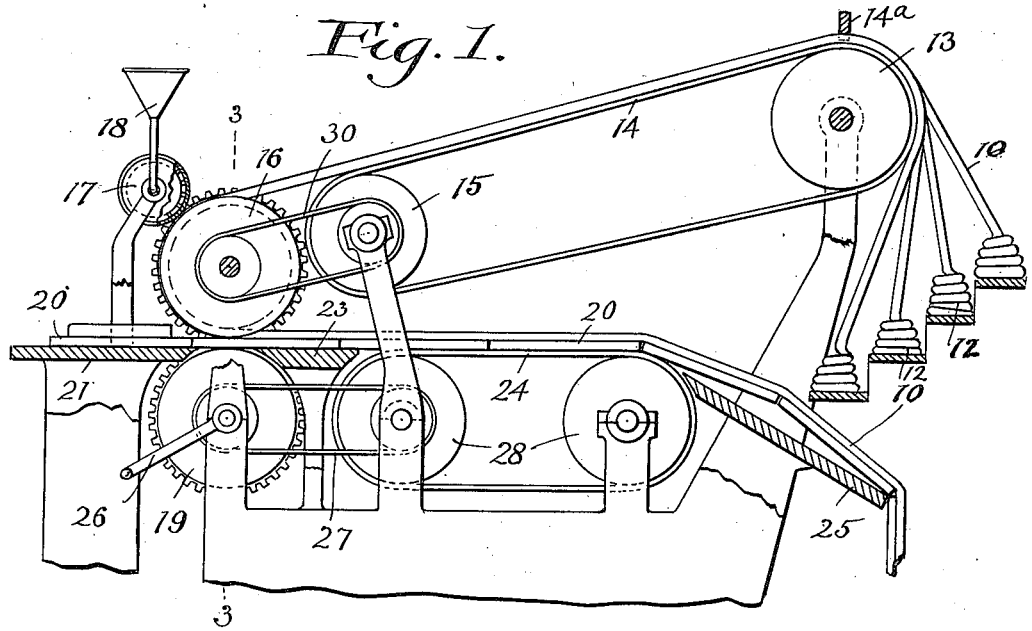

H. L. BOYER.
METHOD OF APPLYING RIBS TO STORAGE BATTERY SEPARATORS.
APPLICATION FILED JULY 6, 1915.

1,297,643.

Patented Mar. 18, 1919.

2 SHEETS—SHEET 1.

Inventor.
Harry L. Boyer
by Thurston & Kwis
Attys.

H. L. BOYER.
METHOD OF APPLYING RIBS TO STORAGE BATTERY SEPARATORS.
APPLICATION FILED JULY 6, 1915.

1,297,643.

Patented Mar. 18, 1919.
2 SHEETS—SHEET 2.

Inventor
Harry L. Boyer
by Thurston & Kwis
Attys.

UNITED STATES PATENT OFFICE.

HARRY L. BOYER, OF TRENTON, NEW JERSEY.

METHOD OF APPLYING RIBS TO STORAGE-BATTERY SEPARATORS.

1,297,643.          Specification of Letters Patent.     Patented Mar. 18, 1919.

Application filed July 6, 1915. Serial No. 38,065.

*To all whom it may concern:*

Be it known that I, HARRY L. BOYER, a citizen of the United States, residing at Trenton, in the county of Mercer and State of New Jersey, have invented a certain new and useful Improvement in Methods of Applying Ribs to Storage-Battery Separators, of which the following is a full, clear, and exact description.

This invention relates to a method of applying ribs to storage battery separators formed wholly or partially of rubber, celluloid or other material of which separators are or may be formed.

Storage battery separators generally used in storage batteries are of three types, viz: the plain or flat type, the corrugated type and the ribbed type. When the rib separators are formed from certain material, such as rubber and celluloid, it is essential or desirable that the ribs be applied to the flat separators and secured thereto by a cementing or vulcanizing process.

The methods in use at the present time for applying ribs to separators are slow and tedious, and in view of the time and labor involved add much to the cost of the separators. For example, it is customary at the present time to apply ribs to rubber separators by placing strips of rubber previously cut to proper length in parallel grooves of one-half of a vulcanizing mold, and then placing the upper half of the mold containing the rubber separator down onto the lower half so that the separator will bear against the upper sides or faces of the ribs. Then the mold is placed in a vulcanizer for the purpose of curing the ribs and causing them to adhere to the separator.

In producing celluloid separators, celluloid strips previously cut to the proper size and length are applied to the celluloid separator one at a time. In doing this the operator picks up a strip, coats it with a suitable cement and then places it upon the separator and by running his hand back and forth over the strip presses it firmly down onto the separator until it adheres thereto.

With both of these methods each individual rib is separately handled and applied either to the separator or to the grooved mold, and for that and other reasons both methods are unsatisfactory so far as the time and labor involved are concerned.

The object of the present invention is to provide a method of ribbing separators, or of applying ribs thereto, which is much faster and less expensive than the methods in use heretofore, and which produces results equally or more satisfactory than the present methods.

With my improved method, the necessity of separately handling or applying the ribs is eliminated, and at the same time the ribs are applied rapidly and effectively. This is accomplished in the preferred manner of carrying out my invention by attaching or applying adhesive rib-forming strips supplied in suitably spaced parallel rows, to a series of flat separators, which, in the event rubber separators are being ribbed, can subsequently be placed in a vulcanizer to cure the ribs and cause them to be permanently and integrally united to the body of the separator.

Preferably the ribs are applied by simultaneously feeding the rib-forming strips and the flat separators between pressure devices which may be and preferably are rolls which press or squeeze the strips onto the separators and space or guide the strips in such a way that when applied to the separators they will be the proper distance apart and will be properly positioned on the separators.

Figure 2:
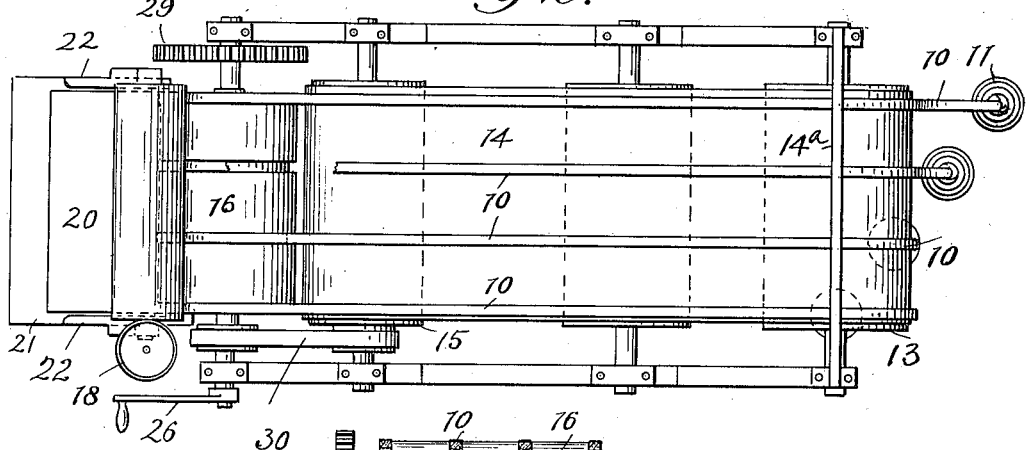
Figure 3:
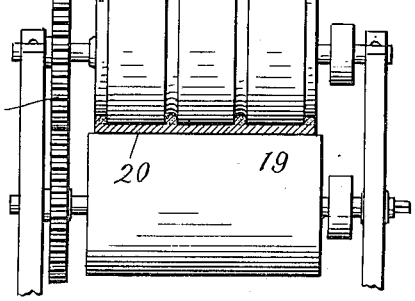
Figure 4:
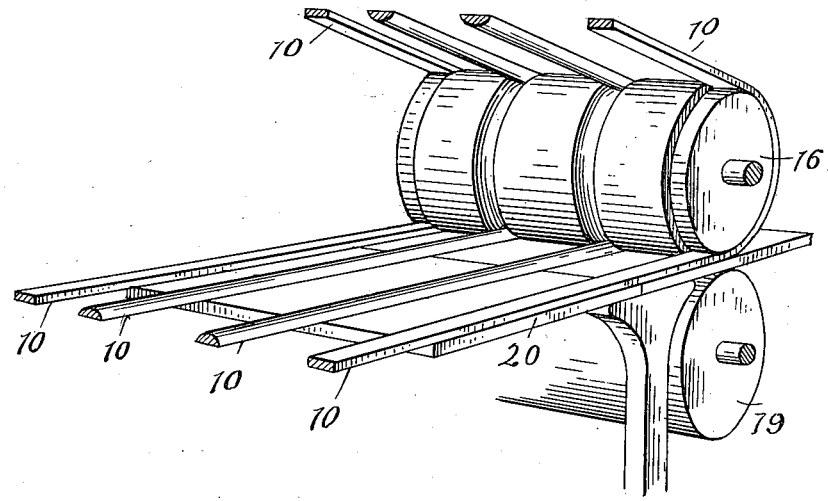
Figure 5:
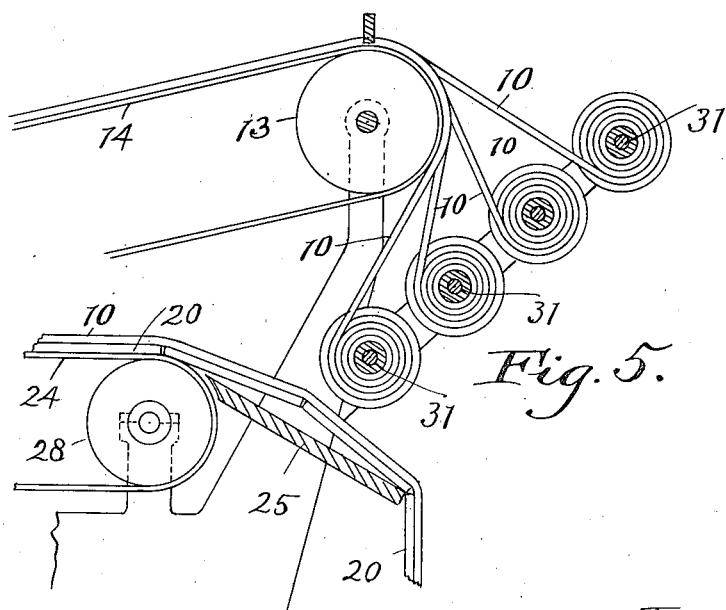

Although the novel features of my invention may be carried out in numerous specifically different ways, and with different forms of machines or apparatus, in the drawings I have shown somewhat conventionally one form of apparatus which may be used with high efficiency, and in the drawings Figure 1 is a side view of the apparatus with parts broken away and in section; Fig. 2 is a plan view of the same; Fig. 3 is a section substantially along the line 3—3 of Fig. 1; Fig. 4 is a perspective view looking toward the discharge or rear side of the pressure rolls; and Fig. 5 is a view of a part of the machine showing a modification in the means for applying the rib material, this construction or manner of supplying the rib material being preferred when rib material other than unvulcanized rubber is employed.

The rib-forming strips which are applied to the flat separators to form ribs, may be made into strips or strands either by being first rolled into sheets and cut into strips, or material from which the strips are formed may be put into a machine and squirted through dies, this latter method being particularly efficacious when the ribs are formed of rubber. The machine here shown is employed in connection with strips which are squirted through dies which may form a part of a regular rubber squirting machine which forms no part of the present invention and is not illustrated.

While the strips shown at 10 are being squirted they are allowed to accumulate in piles 11 and are kept from sticking together by being dusted with a powder or common flour, it being understood that, as in this instance, when the strips are formed from rubber adapted to be applied to rubber separators, the rubber will be in sticky unvulcanized condition. After a sufficient amount of strips or strands have been squirted, they are placed under the machine here shown on shelves 12, each one in its proper position, and with the piles 11 so positioned that the strips will be in parallel rows when passing through the machine. When the machine is in operation the strips are brought up over a drum 13 and carried down along a belt 14 through a spacer 14ª having openings the proper distance apart. The strips 10 pass on down the belt which runs around the drum 13 and also around a second suitably positioned drum 15, and thence the strips pass around a roller 16 having peripheral grooves of the proper shape and a proper distance apart. While the strips pass over or around this roller 16, they pass under a second roller 17 covered with felt, which roller is hollow and is supplied with gasolene from a suitable source such as shown at 18, the gasolene being permitted to pass from the interior of the roller through openings so as to saturate the felt covering. The gasolene wets the strands or strips just before they are applied to the flat separators and makes the material sticky and very adhesive.

Beneath the roller 16 is a second roller 19, which is preferably of the size of the upper roller 16 and is spaced from the latter substantially the thickness of the flat separators to which the strips are to be applied to form the ribs. These flat separators 20, a number of which are shown in Fig. 1, are fed preferably continuously, or one after another, between the rolls 16 and 19, and as they are fed through the rolls the adhesive rib-forming strips 10 are pressed or squeezed down onto the separators and caused to adhere thereto, the strips being applied in parallel rows to the separators.

The separators may be fed automatically or they may be fed by hand between the rolls 16 and 19, there being shown in this instance a feeding table or platform 21 just in advance of the rolls, this feeding table having along its sides guides 22 between which the separators are fed and which position the separators so that the rubber strips will be applied to them properly.

As the separators pass through the rolls they slide along a table or platform 23 and are then received on a substantially horizontal belt 24 which carries the now ribbed separators forwardly a suitable distance over a discharge board or table 25. It will be observed that as the separators pass through the rolls and move along the table 23 and belt 24 they are fastened together by the rib-forming strips. After these separators now ribbed and thus fastened together by the rib-forming strips pass through the machine they will be separated or cut apart by cutting the strips between the separators, and in the event that rubber separators are being ribbed, they will be placed in a vulcanizer so as to cure the ribs and cause the latter to be knitted or vulcanized to the separators.

The various rolls and drums for the belts may be driven by power, as is obvious, but in this instance the shaft for the drum 19 is provided with a hand crank 26. From this drum movement is transmitted through a belt 27 to one of two drums 28 about which the belt 24 passes, and movement is transmitted from the drum 19 to the drum 16 by gears 29. From the drum 16 movement is transmitted by a belt 30 to the drum 15 about which the belt 14 passes. This method of driving is shown for convenience of the description and illustration and may be modified in any desired way.

The method above described and the apparatus illustrated in the drawings are adapted particularly for applying unvulcanized rubber strips to rubber separators. It may be possible to employ rubber strips which are vulcanized instead of unvulcanized, and in this event the strips may be placed on reels 31 and may be drawn therefrom onto the belt 14, as shown in Fig. 5, it being understood that the strips will be coated with a suitable rubber cement while passing around the roll 16. It may be mentioned at this point that when the rib-forming strips or strands consist of unvulcanized rubber they are fed onto the belt 14 from the piles 11 instead of from reels, because the unvulcanized strips have practically no tensile strength and might be pulled apart if drawn from reels.

In applying celluloid strips to celluloid separators substantially the same method above described will be carried out. Rib-forming material in the form of strips of celluloid will be fed onto the belt 14 preferably from reels, such as shown in Fig. 5, and the drum 17 instead of being provided with gasolene will be provided with a suitable celluloid cement, such as celluloid dissolved in acetone. This will render the strips very sticky and highly adhesive, so that when they pass around the roll 16 they will adhere to the separators fed between the rolls 16 and 19.

The apparatus shown in the drawings for carrying out my improved method constitutes the subject matter of a companion application filed by me of even date herewith.

While I have described in detail the preferred way of carrying out my invention, this method as described may be modified in several particulars without departing from the spirit or principal features of the invention, and I, therefore, do not desire to be confined to the exact details herein disclosed.

Having thus described my invention, what I claim is:—

1. The method of applying ribs to separators, which comprises attaching rib material in the form of strips onto a series of separators, and severing the strips between the separators.

2. The method of providing ribs on flat storage battery separators, which comprises feeding separators along a path, and applying rib-forming material in the form of continuous strips in parallel rows successively onto a plurality of the moving separators.

3. The method of applying ribs to separators, which comprises applying and pressing adhesive rib-forming material in the form of long strips in parallel rows onto a number of separators and severing the strips between the separators.

4. The method of applying ribs to separators, which comprises applying and pressing rows of rib-forming material in the form of long strips onto a number of separators, and severing the strips between the separators.

5. The method of applying ribs to separators, which comprises feeding a number of separators along a path, and while said separators are in motion pressing parallel rows of continuous adhesive rib-forming material successively onto a plurality of the separators.

6. The method of applying ribs to separators, which comprises simultaneously feeding flat separators and rib-forming material in the form of continuous parallel strips and causing the strips to be pressed successively onto a plurality of the separators so as to adhere thereto.

7. The method of applying ribs to separators, which comprises simultaneously feeding flat separators and rib-forming material in the form of strips and causing the strips to be pressed onto the separators so as to adhere thereto, and severing the strips between the separators.

8. The method of applying ribs to separators, which comprises feeding adhesive rib-forming material in the form of continuous parallel strips successively onto a plurality of moving separators.

9. The method of applying ribs to separators, which comprises feeding rib-forming material in the form of strips onto a series of moving separators, and applying a substance to said strips just before they engage the separators so as to make the strips adhesive.

10. The method of applying ribs to separators, which comprises carrying rib-forming material in the form of continuous parallel strips along one path, feeding separators along another path and at a given point causing the strips to be attached to a plurality of the moving separators.

11. The method of applying ribs to separators, which comprises feeding and guiding along a given path rib-forming material in the form of strips in parallel rows with the strips predetermined distances apart, feeding separators along a given path, applying a substance to the strips so as to render them adhesive, pressing the moving strips onto the moving separators, and severing the strips between the separators.

12. The method of applying ribs to rubber storage battery separators, which comprises attaching unvulcanized rubber in the form of long strips onto a series of separators and severing the strips between the separators.

In testimony whereof, I hereunto affix my signature.

HARRY L. BOYER.